(No Model.)
R. WRAY.
LOCK JOINT FOR BEAMS.
No. 409,893. Patented Aug. 27, 1889.
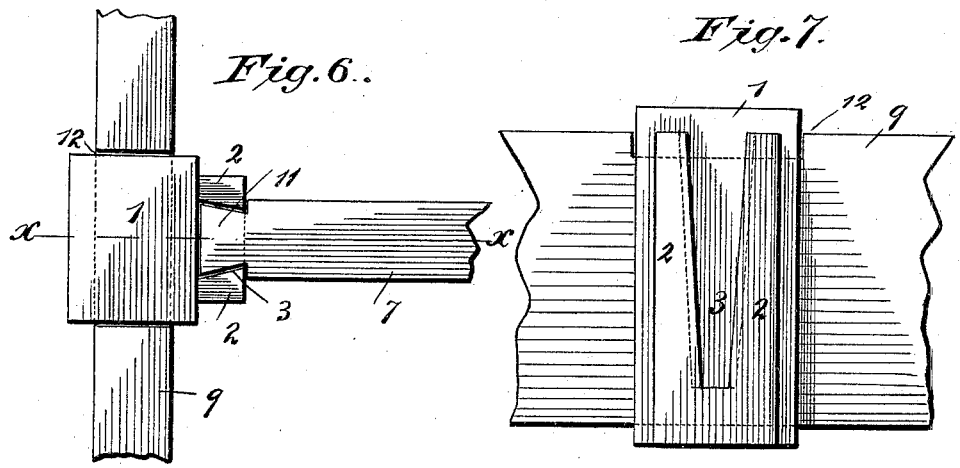
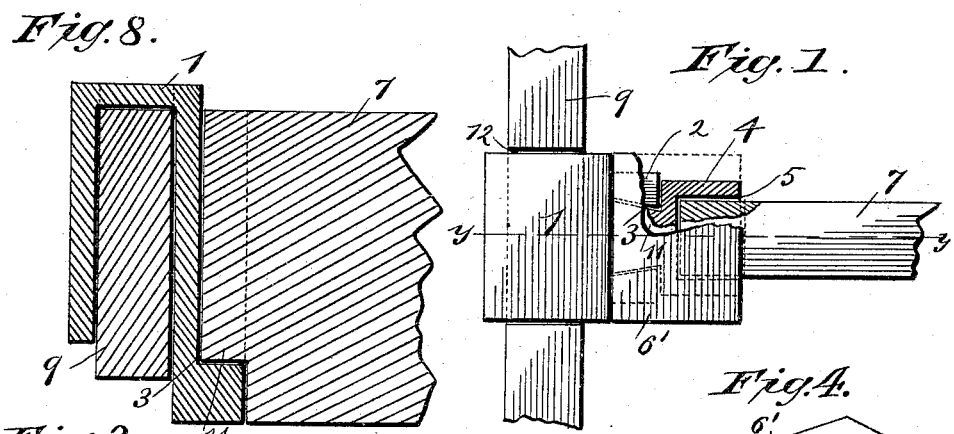
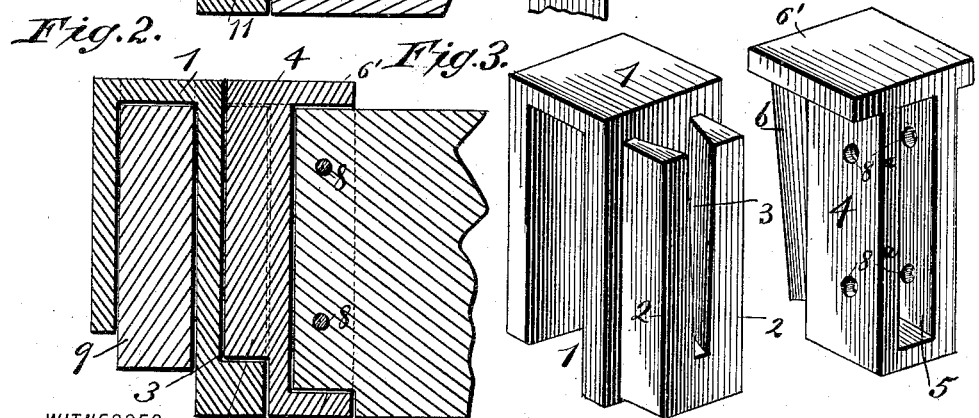
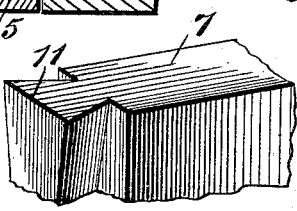
WITNESSES:
Phil C. Dieterich
C. Sedgwick
INVENTOR
R. Wray
BY
Munn & Co.
ATTORNEY

UNITED STATES PATENT OFFICE.

ROBERT WRAY, OF NEW YORK, N. Y., ASSIGNOR TO HIMSELF, WALTER S. HAMILTON, AND E. KNOX LITTLE, OF SAME PLACE.

LOCK-JOINT FOR BEAMS.

SPECIFICATION forming part of Letters Patent No. 409,893, dated August 27, 1889.

Application filed April 3, 1889. Serial No. 305,819. (No model.)

*To all whom it may concern:*

Be it known that I, ROBERT WRAY, of the city, county, and State of New York, have invented a new and Improved Lock-Joint for Beams, of which the following is a full, clear, and exact description.

This invention relates to devices for connecting and supporting the ends of beams with transverse beams or supports, and has for its object to provide a locking-joint for beams which will obviate the cutting and mortising of transverse supporting-beams, thereby weakening them, and will afford a strong and durable lock-support, by means of which a beam may be readily placed in position and will not be liable to be pulled out of place.

The invention consists in a lock-joint for the ends of beams and in details thereof, constructed and arranged as hereinafter described and claimed.

Reference is to be had to the accompanying drawings, forming a part of this specification, in which similar figures of reference indicate corresponding parts in all the views.

Figure 1 is a plan view, with parts broken away, of a lock-joint constructed in accordance with this invention, and shown as connecting two beams. Fig. 2 is a vertical section thereof on the line $y$ $y$, Fig. 1. Figs. 3 and 4 are details thereof in perspective views. Fig. 5 is a portion of a beam with a dovetailed end; and Fig. 6 is a plan view, with parts broken away, of a portion of the lock-joint shown as connecting the beam in Fig. 5 with a transverse beam. Fig. 7 is a face view of the lock-joint portion in Fig. 6 with beam removed, and Fig. 8 is a vertical section of the lock-joint portion and beams on the line $x$ $x$, Fig. 6.

The lock-joint constructed in accordance with this invention is formed in two parts— a hook portion and a bracket portion—both of metal. The hook or U-shaped portion 1 is of a size to be adapted to engage and rest on a beam and has on one face a vertical projection 2, with a dovetail socket 3, open at the top. The socket portion 4 has a socket 5, to receive the end of a beam, a dovetail projection 6, to engage the dovetail socket 3 in the hook portion 1, and a flanged top 6', extending over the projection 2 on hook 1 and abutting against the top of the latter, as shown in Fig. 1. By means of this construction the end of a beam 7 may be inserted in the socket 5 and secured therein by bolts 8, and the dovetail projection 6 slid down into the socket 3. This may be done either before the hook 1 is placed in engagement with a beam 9, or after. It will thus be seen that the end of beam 7 may be readily secured in place and removed when necessary without any cutting or mortising of the beams in forming the joint, and by means of the hook 1 may be supported on any portion of the beam 9. The end of beam 7 will by means of this lock-joint be securely and firmly held in place without any liability of the end of the beam 7 being pulled out of the joint, owing to the dovetail connection which serves as a lock.

If desired, the hook portion 1 may be used without the socket portion 4, as shown in Figs. 6, 7, and 8, the hook 1 engaging the beam 9, and a beam 10, with a dovetail end 11, engaging the socket 3 of projection 2.

Beams of metal or wood may be employed with the lock-joint; but where the hook portion 1 only is used a metallic beam is preferably employed, as the dovetail end 11, cut out in wooden beams, is apt to weaken the end of the beam.

The beam 9 may be provided with a recess 12 for the upper portion of hook 1 to rest in, thereby holding the hook from endwise movement on the beam, or the recess 12 may be omitted and the hook 1 rest on the upper part of the beam.

By means of a lock-joint constructed as herein set forth the ends of beams may be readily connected to transverse supports and will be held firmly and securely in position.

Having thus described my invention, I claim as new and desire to secure by Letters Patent—

1. A lock-joint for beams, formed in two parts consisting of a socket portion to receive the end of a beam and a hook portion to engage with a beam, the socket portion being connected to the hook portion by a dovetail projection on the socket portion engaging a dovetail socket in the hook portion, substantially as described.

2. In a lock-joint for beams, the dovetail-socket portion 2, having a hook 1, to engage and rest on a beam, substantially as described.

3. A lock-support for beams, formed in two parts consisting of the dovetail-socket portion 2, with hook 1, for engaging a beam, and the socket portion 4, to receive the end of a beam, with the dovetail projection 6, engaging the socket 3 in the hook portion 1, substantially as described.

ROBERT WRAY.

Witnesses:
E. KNOX LITTLE,
G. P. H. McVAY.